Nov. 1, 1955

R. E. BROOKS 2,722,253

WALNUT HALVING MACHINE

Filed March 13, 1953

INVENTOR
Robert E. Brooks
BY
*Webster & Webster*
ATTY'S

United States Patent Office 2,722,253
Patented Nov. 1, 1955

2,722,253
WALNUT HALVING MACHINE
Robert E. Brooks, Stockton, Calif.
Application March 13, 1953, Serial No. 342,249
7 Claims. (Cl. 146—73)

The present invention is directed to, and it is a major object to provide, an improved power driven walnut halving machine; the machine being operative to individually support and convey walnuts in a given path of travel, and to saw the walnuts in half from end to end thereof at a predetermined point in such path, whereby the walnut meat halves may subsequently be readily removed, usually in one piece, from the cut shell halves.

Another important object of the instant invention is to provide a walnut halving machine, as above, which includes—in combination with a longitudinal conveyor comprised of spaced parallel endless chains—pairs of opposed, cam advanced plungers mounted on the chains, and facing cups on adjacent ends of said plungers adapted, when the latter are cam advanced, to engage and support a walnut therebetween for travel toward, into, and beyond a circular saw for halving of the walnut.

An additional object of this invention is to provide a walnut halving machine, as in the preceding paragraph, which embodies a novel cam structure operative to work the pairs of opposed plungers in predetermined timed relation to travel of the endless chains to which said plungers are attached; there being an effective guide assembly arranged to maintain the chains and plungers against vertical deflection during the time that the plungers and cups are cam advanced into a walnut engaging and supporting position.

A further object of the invention is to provide a walnut halving machine wherein the cam structure is arranged to permit of a slight retraction of the plungers and walnut supporting cups upon the walnut being cut through by the saw and the cut walnut halves transferring onto an adjacent divider plate which the machine includes; the purpose being to relieve such cut walnut halves to an extent such that they are not chipped or fractured by the trailing edge of the saw as they so transfer.

A still further object of the invention is to provide the walnut halving machine, at the lead or forward end thereof, with a walnut receiving and locating unit of novel structure; the purpose of such unit being to support each nut in an exact position for pick up by the cups of the pair of plungers next cam advanced in the progressive operation of the machine.

It is also an object of the invention to provide a walnut halving machine designed for easy and economical manufacture; simplicity of operation; long and continued use, with a minimum of maintenance and servicing; and one capable of relative large output.

Still another object of the invention is to provide a practical and reliable machine, and one which will be exceedingly effective for the purpose for which it is designed.

These objects are accomplished by means of such structure and relative arrangement of parts as will fully appear by a perusal of the following specification and claims.

Figure 1:
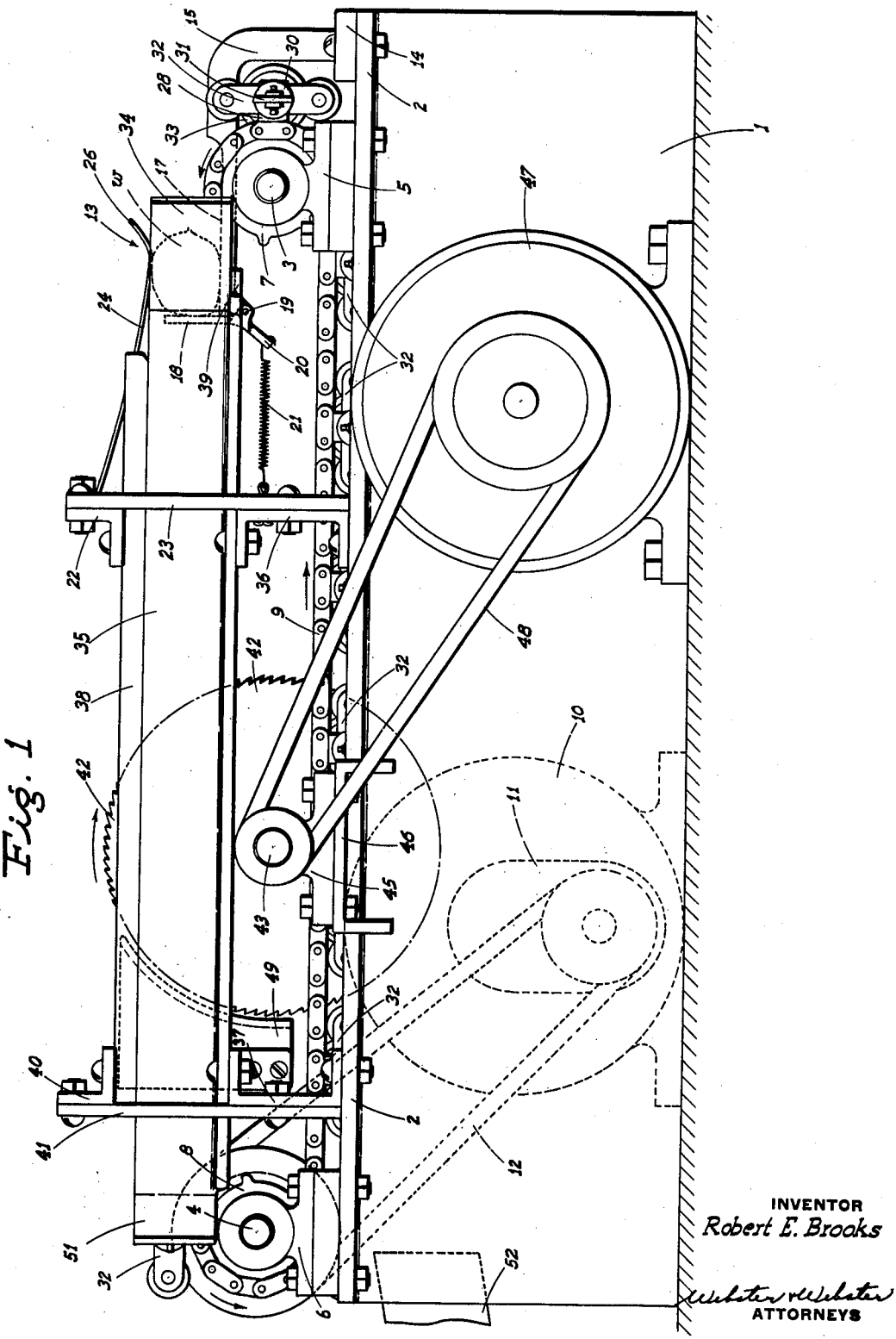
Fig. 1 is a side elevation of the improved walnut halving machine.
Figure 2:
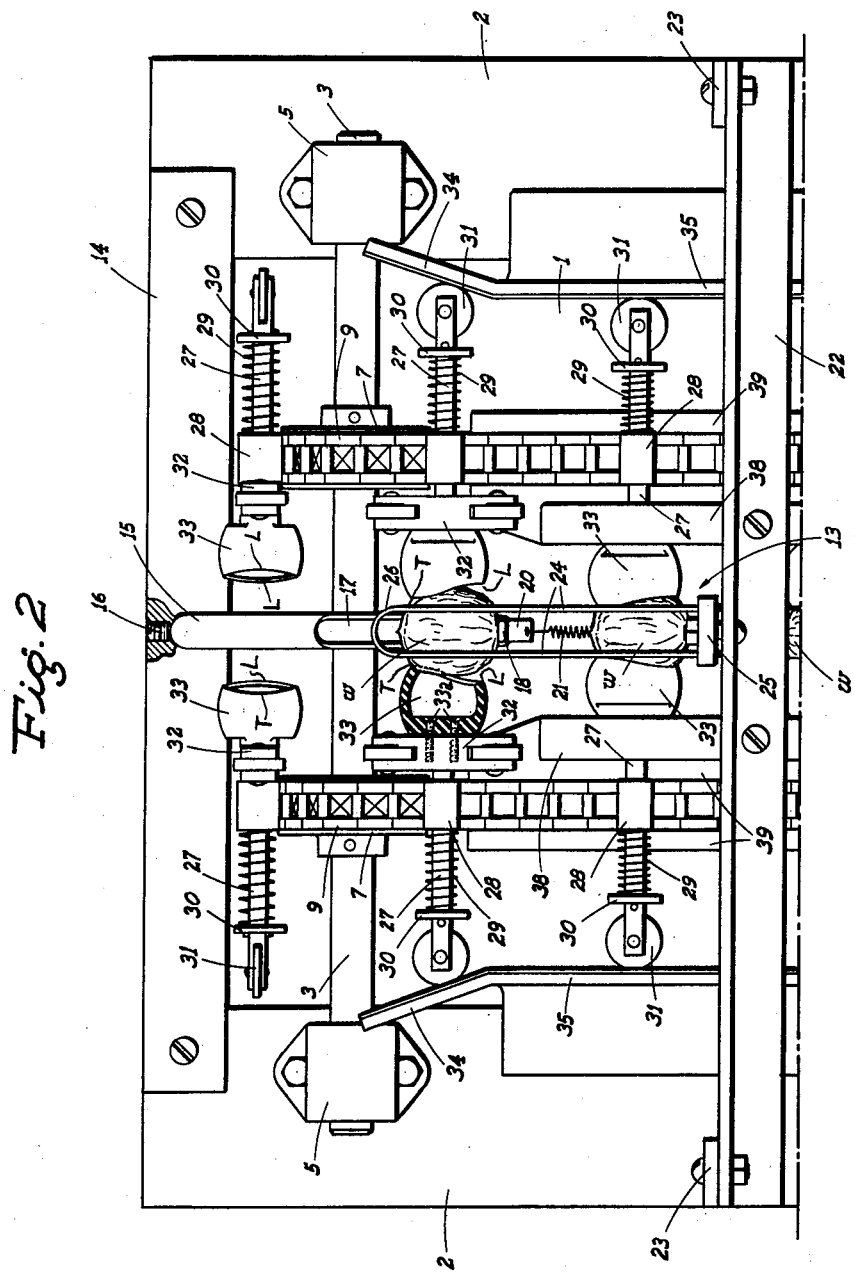
Fig. 2 is a fragmentary plan view of the forward portion of the machine, including the walnut receiving and locating unit; certain parts being shown in section.

Referring now more particularly to the characters of reference on the drawings, the improved walnut halving machine comprises an elongated base 1 in the form of a longitudinal channel; such channel including—at its upper longitudinal edges—laterally outwardly projecting horizontal flanges 2.

A front cross shaft 3 and a rear cross shaft 4 span between opposite sides of the base 1 at corresponding ends of the latter; the journals for said shafts being secured to the flanges 2, with the front journals indicated at 5 and the rear ones at 6.

The front cross shaft 3 is fitted with transversely spaced front sprockets 7, while the rear cross shaft 4 is fitted with transversely spaced rear sprockets 8; there being a pair of endless chains 9 trained about and extending between corresponding ones of said front and rear sprockets.

As so mounted, the endless chains 9 provide a conveyor, for the purpose hereinafter described, which conveyor travels with its upper run moving in the direction indicated in Fig. 1. Drive of the conveyor is accomplished through the medium of an electric motor 10 and a reduction gear box 11 connected to the rear cross shaft 4 by an endless belt and pulley unit, indicated generally at 12.

Between the upper runs of the chain 9 at a point adjacent but slightly short of the front end of the conveyor, the machine includes a walnut receiving and locating unit, indicated generally at 13; such unit comprising the following:

At its front end the base 1 is fitted with a cross bar 14, and a vertical leg 15 is socketed in such cross bar at a central point, being secured in place by a set screw 16.

The leg 15 is formed integral with and supports a rearwardly projecting or longitudinal trough 17 disposed centrally between the upper runs of the chains 9; such trough being semi-circular in cross section and initially open at its rear end. Such rear end of the trough 17 is normally closed by a rearwardly yieldable stop 18 of substantial height; such stop being pivoted, as at 19, to a low point on the rear end of said trough 17. An ear 20 depends from the stop 18 below the pivot 19, and a rearwardly extending tension spring 21 connects between the ear 20 and a suitable anchor point. With this arrangement the stop 18 normally upstands at the rear end of the trough 17, but may yield and swing rearwardly and downwardly to a substantially horizontal position.

Above the conveyor and back of the stop 18 there is an upper cross bar 22 supported—at the ends—by posts 23 which upstand from the flanges 2. A pair of longitudinal, transversely spaced spring hold-down fingers 24 are clamped at one end, as at 25, to the cross bar 22 centrally of its ends, and thence such fingers extend at a slight downward incline toward and overhang the rear portion of the trough 17; the fingers being connected at their free ends in the form of an upturned tip 26. With this arrangement the spring fingers 24 lie in a longitudinal plane the same as the trough 17 whereby upon placement of a walnut W in supported relation on the trough 17 and in abutment with the stop 18, such walnut is effectively held down from above by said spring fingers 24. The upturned tip 26 facilitates entry of the walnut W between the trough 17 and said spring fingers 24 to a position engaging the stop 18.

As so supported each walnut W is in position to be picked up and carried rearwardly through the machine by the following mechanism:

The chains 9 are fitted at equi-distantly spaced points in the length thereof with pairs of opposed spring retracted plungers 27; such plungers being rectangular in cross section and slidably projecting through attachment blocks 28 welded to links of such chains. The spring retraction of the plungers 27 is accomplished by compression springs 29 surrounding said plungers between the blocks 28 and collars 30 on the plungers 27 adjacent but short of their outer ends.

At their outer ends the plungers 27 each carry a roller 31. At their inner or adjacent ends the plungers 27 are each fitted with a tandem guide roller unit 32, each of which units carries a centrally disposed, inwardly projecting cup 33 secured in place by screws 33A. The cups 33 are open-mouthed, opening towards each other and are of a relatively stiff but flexible and resilient material, such as rubber. As shown, the cups 33 are of lesser depth at their leading end than at their trailing end.

As each pair of cups 33 approaches the position occupied by a walnut W supported in the receiving and locating unit 13, the rollers 31 of the related plungers run onto rearwardly converging entry wings 34 included at the lead end of vertically disposed longitudinal cam plates 35. When this occurs the plungers 27 and the cups 33 of such pair are moved laterally inwardly in unison; the cups then effectively engaging and gripping such walnut from opposite sides. It is to be noted that the walnut as disposed in the receiving and locating unit 13 lies lengthwise with the suture horizontal.

The vertically disposed longitudinal cam plates 35 are supported in the machine on front and rear lower cross bars 36 and 37.

After the plungers 27 of each pair are advanced laterally inwardly by the entry wings 34, the cups 33 hold the nut in positive engagement from opposite sides and for longitudinal travel through the machine; the rollers 31 riding along the longitudinal cam plates 35 to maintain the plungers so advanced.

Figure 4:
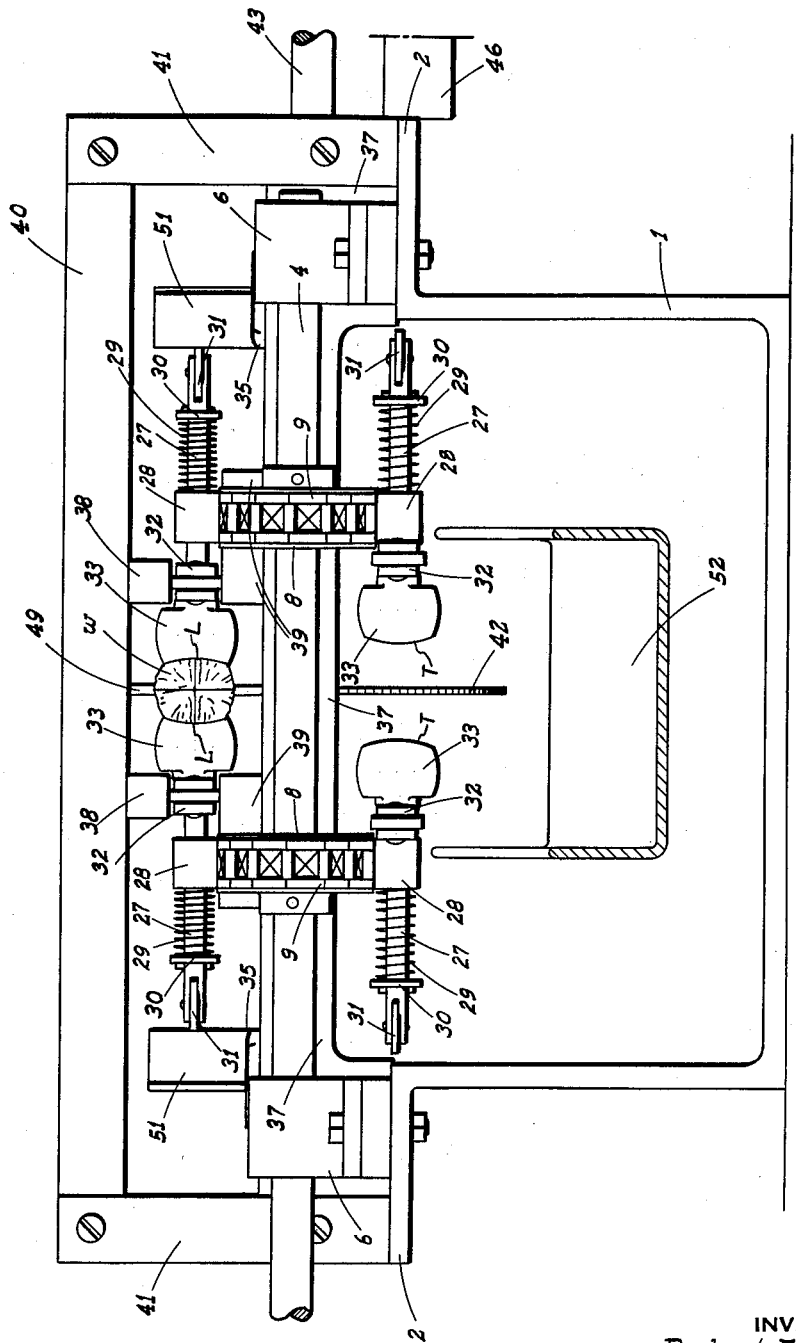
Fig. 4 is a rear end elevation of the machine; certain parts being shown in section.

In order to assure against any vertical deflection of the plungers 27 and cups 33 of each pair, the tandem guide roller units 32 travel for substantially the full length of the longitudinal cam plates 35 between upper longitudinal guide rails 38 and lower longitudinal guide rails 39 (see Fig. 4). The upper longitudinal guide rails 38 are fixed in the machine by connection to the front upper cross bar 22 and a rear upper cross bar 40 supported by posts 41 which upstand from the flanges 2.

The lower longitudinal guide rails 39 are supported by the front lower cross bar 36 and near lower cross bar 37.

The lower longitudinal guide rails 39 are of increased width laterally outwardly, and are channeled for the reception of the upper runs of the chains 9 so that the attachment blocks 28 are substantially flush at the bottom with the top of said rails 39.

By reason of the fact that the cups 33 of each pair are of lesser depth at their leading end L than at their trailing end T, a more effective initial engagement and more positive subsequent gripping of each walnut is accomplished than would otherwise be the case. After each walnut W is gripped between a pair of advanced cups 33, continued rearward travel of the upper runs of the chains 9 carries such gripped and supported walnut downwardly out of the walnut receiving and locating unit 13; the stop 18 being merely pushed downwardly and downwardly until the walnut advances clear of such stop, whence the latter springs back to its normal position to aid in locating the next nut placed in unit 13.

With continuing advance of the upper run of the chains 9 each cup-supported nut is engaged and cut centrally and vertically in half by a high speed circular saw 42 which turns in the direction indicated by the arrow in Fig. 1. The circular saw 42 is carried on a horizontal transverse arbor 43 having one journal 44 on one of the flanges 2 and an outward journal 45 on a lateral extension 46 of said flange. The arbor 43 is driven from an electric motor 47 by means of an endless belt and pulley unit 48.

After the high speed circular saw 42 has cut through and centrally vertically split each walnut W, the walnut halves—as they advance beyond the saw—are separated by a divider plate 49 whose lead edge is sharpened and closely follows the periphery of the saw, as shown.

Figure 3:
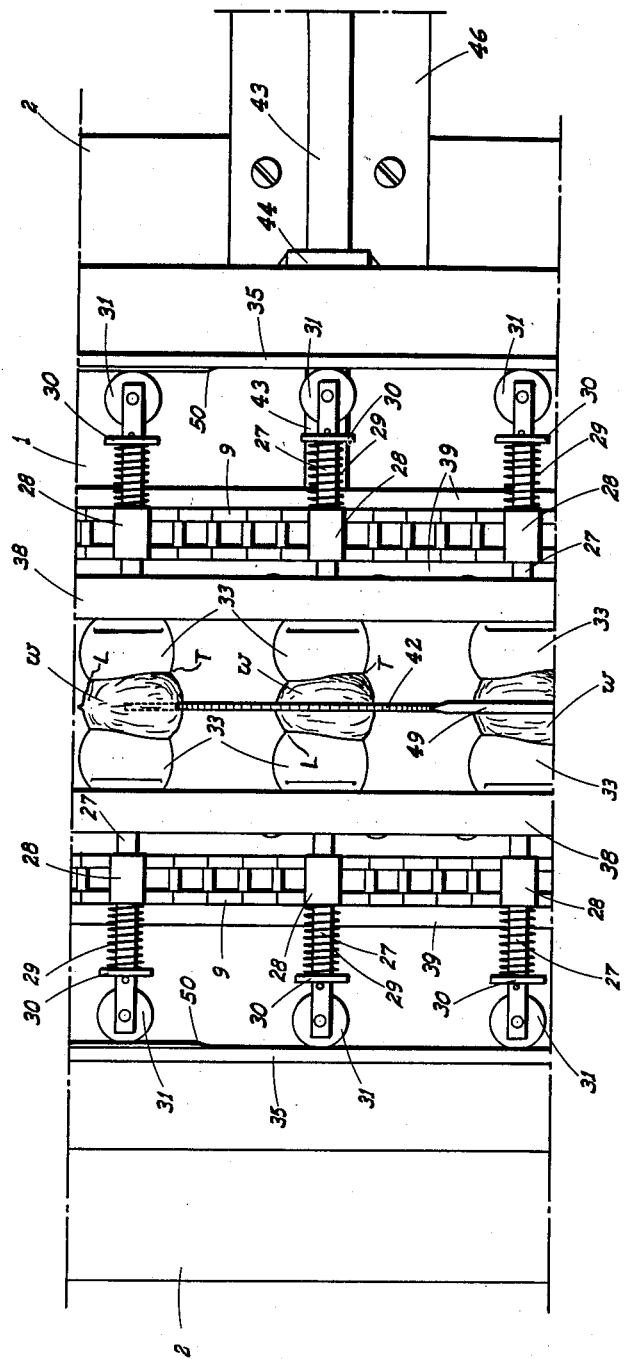
Fig. 3 is a fragmentary plan view of the intermediate portion of the machine, showing the circular saw as in use.

In order to prevent possible binding of the cut walnut halves on the saw as such halves pass onto the divider plate 49, the opposed cups 33 and plungers 27 are relieved slightly at such time; this being accomplished by providing a short cam drop 50 on each cam plate 35 at a proper point in the length thereof. (See Fig. 3.)

As the cup-supported and cut walnut halves approach the end of the machine, such halves escape the divider plate 49 and the rollers 31 escape the cam plates 35, the rear ends of which flare outwardly, as at 51. This results in the cups 33 and plungers 37 of each pair assuming a fully retracted and separated position, and as such cups pull apart the cut walnut halves drop therefrom onto a chute 52 which discharges into a suitable receiving container (not shown). As so discharged into the receiving container the cut walnut halves are ready for subsequent processing; i. e., the removal of the nut meat halves.

After each pair of cups 33 and the related plungers 27 are retracted, to discharge the cut walnut halves as above, such parts travel forwardly with the lower runs of the chains 9 preparatory to again traversing the machine in the upper run thereof.

The foregoing walnut halving machine functions smoothly, positively, and effectively for halving walnuts supported and conveyed in a continuous row; the machine subsequent to placement of each walnut in the receiving and locating unit 13 acting wholly automatically to accomplish the intended result.

From the foregoing description it will be readily seen that there has been produced such as a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A walnut halving machine comprising a frame, a driven conveyor on the frame, the conveyor including transversely spaced endless chains, pairs of opposed initially retracted plungers mounted intermediate their edges on the chains for laterally inward advance, walnut engaging cups on the inner ends of the plungers, the cups of each pair opening toward each other, a walnut supporting trough disposed lengthwise centrally between the chains adjacent the forward end thereof, means cooperating with the trough to locate a walnut on said trough at a predetermined mount position in the length thereof for initial gripping of the supported walnut from opposite sides by the cups of each pair of plungers upon advance of the latter, a driven transverse axis circular saw disposed between the conveyor elements, toward the rear end thereof, and longitudinal cams fixed on the frame laterally out from the conveyor and arranged to engage the plungers and, upon rearward movement of the upper run of the chains in the direction of the saw, to advance the cup into gripping engagement with a located trough supported nut and to maintain the nut gripped until it has been moved to and cut through by the saw.

2. A machine as in claim 1, with spring hold-down means arranged to engage a trough-supported walnut from above.

3. A machine as in claim 1, in which the cups are of lesser depth at their leading end than at their trailing end.

4. A machine as in claim 1, in which the cams are arranged to allow of a relatively slight retraction of the cups as soon as a walnut held thereby is engaged by the saw in cutting relation, and a full retraction of the cups as soon as they have passed beyond the saw.

5. In a walnut halving machine, a conveyor including endless transversely spaced chains, a transverse-axis circular saw mounted between the chains adjacent one end of the conveyor, opposed cups on the chains to grip nuts and feed the same past the saw, a nut supporting unit mounted between the upper run of the chains ahead of the saw and comprising a seat element for a walnut disposed at a level for engagement of a seated walnut by opposed cups on the upper run of the chains and moving in the direction of the saw, the seat at its rear end being open to allow movement of the walnut from the seat without deviation from a plane parallel to the upper run of the chains, and a rearwardly yieldable stop at and extending above the rear end of the seat.

6. A machine as in claim 5, with spring hold-down means arranged to engage a seat-supported walnut from above without interfering with the engagement of such walnut by the opposed cups.

7. A walnut halving machine comprising a frame, transversely spaced longitudinal conveyor elements movable rearwardly in unison on the frame, initially retracted opposed individual walnut gripping devices mounted on the conveyor elements for lateral inward movement, a walnut supporting unit disposed between the conveyor elements adjacent the forward end thereof, said unit including a seat for a walnut, a driven transverse axis circular saw disposed between the conveyor elements adjacent the rear end thereof, means mounted on the machine responsive to rearward travel of the conveyor elements to cause the gripping devices to be advanced so as to grip a walnut on the seat and move such walnut past the saw while maintaining the nut gripped until the same has been cut through by the saw, and a rearwardly yieldable stop mounted in connection with the seat and preventing movement of an ungripped nut rearwardly from the seat.

References Cited in the file of this patent

UNITED STATES PATENTS

| | | |
|---|---|---|
| 1,490,493 | Tenney | Apr. 15, 1924 |
| 1,915,447 | Robbins | June 27, 1933 |
| 2,067,566 | Field | Jan. 12, 1937 |
| 2,498,962 | Patterson | Feb. 28, 1950 |

FOREIGN PATENTS

| | | |
|---|---|---|
| 216,452 | Great Britain | May 29, 1924 |